(12) United States Patent
Wang et al.

(10) Patent No.: US 8,358,699 B2
(45) Date of Patent: Jan. 22, 2013

(54) METHOD AND SYSTEM FOR SELECTION OF REFERENCE PICTURE AND MODE DECISION

(75) Inventors: Jian Wang, Sunnyvale (CA); Zhang Yong, Fremont, CA (US)

(73) Assignee: Cavium, Inc., Mountain View, CA (US)

( * ) Notice: Subject to any disclaimer, the term of this patent is extended or adjusted under 35 U.S.C. 154(b) by 1228 days.

(21) Appl. No.: 12/082,246

(22) Filed: Apr. 9, 2008

(65) Prior Publication Data

US 2009/0022228 A1 Jan. 22, 2009

Related U.S. Application Data

(60) Provisional application No. 60/922,678, filed on Apr. 9, 2007.

(51) Int. Cl.
*H04N 7/12* (2006.01)

(52) U.S. Cl. .................................. 375/240.24

(58) Field of Classification Search ............. 375/240.01, 375/240.12, 240.16, 240.17, 240.24
See application file for complete search history.

(56) References Cited

U.S. PATENT DOCUMENTS

| | | | |
|---|---|---|---|
| 6,542,545 B1 * | 4/2003 | Vetro et al. ............... | 375/240.08 |
| 6,968,008 B1 * | 11/2005 | Ribas-Corbera et al. ...................... | 375/240.16 |
| 7,194,035 B2 * | 3/2007 | Dumitras et al. ........ | 375/240.26 |
| 7,675,974 B2 * | 3/2010 | Kawashima ............. | 375/240.16 |
| 7,944,965 B2 * | 5/2011 | Bhaskaran et al. ........... | 375/240 |

OTHER PUBLICATIONS

Ortega et al, Rate-Distortion Methods for Image and Video Compression, IEEE, 28 pages, Nov. 1998.*
Wiegand et al, Rate-Distortion Optimized Mode Selection for Very Low Bit Rate Video Coding and the Emerging H.263 Standard, IEEE, 9 pages, Apr. 1996.*

* cited by examiner

*Primary Examiner* — Frank Duong
(74) *Attorney, Agent, or Firm* — Cooley LLP

(57) ABSTRACT

A method, system and computer program product for the selection of reference pictures and mode decision during the motion estimation of a video sequence is disclosed. The video sequence includes a plurality of video frames. Each of the video frames includes a plurality of macroblocks. A full-pixel search is performed for each of the video frames, to calculate one or more full-pel rate distortion costs. Based on the one or more rate-distortion costs, one of the one or more modes is selected. Further, interpolation is performed for each of the video frames. Thereafter, a sub-pixel search is performed for each of the video frames, to calculate the one or more sub-pel rate distortion costs. Finally, a reference video frame is selected, based on the one or more sub-pel rate distortion costs.

13 Claims, 9 Drawing Sheets

METHOD AND SYSTEM FOR SELECTION OF REFERENCE PICTURE AND MODE DECISION

The present application claims the benefit of U.S. Provisional Patent Application bearing Ser. No. 60/922,678, which was submitted to the U.S. Patent and Trademark Office on Apr. 9, 2007, the content of which is hereby incorporated by reference in its entirety.

FIELD OF THE INVENTION

The present invention relates to the field of video encoding. More specifically, the invention relates to a method, system and computer program product for selection of reference picture and mode decision during motion estimation of a video sequence.

BACKGROUND OF THE INVENTION

A video sequence is a series of static images (or pictures) known as a video frame. In video encoding, each video frame includes squares of size 16×16 pixels. Each square of 16×16 pixels is known as a macroblock. The video frame is encoded as one or more slices; each slice includes a definite number of macroblocks. A slice can be an I-slice, a P-slice or a B-slice. An I-slice includes only intra-coded macroblocks, which are predicted from previously encoded macroblocks in the same slice. A P-slice may include intra-coded macroblocks and inter-coded macroblocks, which are predicted from macroblocks in previously encoded video frames. B-slices are bi-directional predicted slices, which include macroblocks that are predicted from the macroblocks of the previously encoded I/P-slices, or the future encoded I/P-slices, or the average of previously and future encoded I/P-slices.

Each macroblock in the slice is divided into partitions of varying sizes. For example, a macroblock may be divided into a partition of 16×16 pixels, two partitions of 16×8 pixels, and the like. Each partition may be further divided into blocks of varying sizes. For example, an 8×8 partition may be divided into two blocks of 8×4 pixels, four blocks of 4×4 pixels, and the like. The possible partitions of the macroblock are referred to as modes.

Many methods are available for predicting the mode within a reference video frame. In one method, a rate distortion optimization (RDO) mode is used. The RDO mode enumerates all the modes and reference pictures in terms of rate distortion costs. For each mode, multiple reference frame motion estimation is first conducted, and thereafter, the resultant rate distortion cost is utilized to make the mode decision. This method requires a significant amount of computational power.

The prediction of a mode within a reference video frame is performed by utilizing several fast-motion estimation methods. These fast-motion estimation methods use a limited number of search points for one type of partition in the motion estimation process. However, these methods result in poor matching and inaccurate selection of a reference picture due to the reduced number of search points.

In another method, the statistical characteristics of motion vectors are utilized to select the reference video frame from multiple reference video frames. The motion vectors crossing the multiple reference video frames are correlated, and the correlation of the motion vectors is utilized to select the final motion vector. This process is repeated for every possible partition of the macroblock. Thereby, the mode decision is made after all the partitions are evaluated. The method therefore requires a significant amount of computational power and time.

Further, various methods are available for an early-mode decision. These methods focus on achieving the best mode by terminating some of the inefficient modes early, thereby saving computational power. However, the methods cannot address the problem of the selection of the reference picture during motion estimation for each macroblock. Further, the methods are suitable for applications that execute the encoding programs sequentially. However, in most applications, all the modes are evaluated concurrently, and therefore, the early termination of the process of motion estimation is not beneficial.

In light of the facts given above, there is a need for a method and system, which performs the selection of reference pictures and mode decision efficiently and accurately. Moreover, the amount of computational power and computational time consumed should also be minimized.

SUMMARY

The present invention provides a novel method, system and computer program product for selection of reference picture and mode decision. A video sequence comprises a plurality of video frames. Each of the plurality of video frames comprises a plurality of macroblocks. The method includes loading a macroblock of a current video frame from a video frame buffer. The macroblock of the current video frame is utilized to conduct a full-pixel search. This full-pixel search is conducted for each of the one or more reference video frames. Further, the full-pixel search is performed to calculate one or more full-pel rate distortion costs. One of the one or more modes is selected, based on the one or more full-pel rate distortion costs. These one or more modes are utilized to partition a macroblock. Subsequently, an interpolation is performed for each of the one or more reference video frames that implement the selected mode. Further, a sub-pixel search is performed for each of the one or more reference video frames, to calculate one or more sub-pel rate distortion costs. One of the one or more reference video frames is selected, based on the one or more sub-pel rate distortion costs. The above-mentioned steps are performed for all the macroblocks of the current video frame.

In another embodiment of the invention, the computer program product for the selection of reference pictures and mode decision loads a macroblock of a current video frame from a video frame buffer. The macroblock of the current video frame is utilized to perform a full-pixel search. Further, the computer program product performs the full-pixel search for each of the one or more reference video frames, to calculate one or more full-pel rate distortion costs. One of the one or more modes is selected, based on the one or more full-pel rate distortion costs. The one or more modes are utilized to partition a macroblock. The computer program product also performs an interpolation for each of the one or more reference video frames implementing the selected mode. Thereafter, the computer program product performs a sub-pixel search for each of the one or more reference video frames, to calculate one or more sub-pel rate distortion costs. Finally, one of the one or more reference video frames is selected, based on the one or more sub-pel rate distortion costs.

In yet another embodiment of the invention, the system for the selection of reference picture and mode decision includes a reference picture selection module and a mode decision module. The reference picture selection module includes a rate distortion calculating module and a reference video frame selecting module. The rate-distortion calculating module calculates one or more full-pel rate distortion costs and one or more sub-pel rate distortion costs. The mode decision module selects one of the one or more modes, based on the one or more full-pel rate distortion costs. Finally, the reference video frame selecting module selects one of the reference video frames, based on the one or more sub-pel rate distortion costs.

BRIEF DESCRIPTION OF THE DRAWINGS

The invention will now be described with reference to the accompanying drawings, which are provided to illustrate various embodiments of the invention. Throughout the description, similar reference names may be used to identify similar elements.

DESCRIPTION OF VARIOUS EMBODIMENTS

Various embodiments of the present invention provide a method, system and computer program product for the selection of reference picture and mode decision during the motion estimation of a video sequence. The video sequence comprises a plurality of video frames. Each of the plurality of video frames comprises a plurality of macroblocks. Each of the plurality of macroblocks is divided into one or more partitions by utilizing one or more modes.

In an embodiment of the invention, the method for the selection of reference picture and mode decision includes loading a macroblock of a current video frame from a video frame buffer. The macroblock of the current video frame is utilized to conduct a full-pixel search for each of the one or more reference video frames. The full-pixel search is performed to calculate one or more full-pel rate distortion costs. Moreover, the reference list that has the best matching is firstly selected for each mode. With the selected reference list, One of the modes is accordingly selected, based on the minimum of the full-pel rate distortion costs. Further, an interpolation is performed for each of the reference video frames implementing the selected mode. Thereafter, a sub-pixel search is performed for each of the one or more reference video frames, to calculate one or more sub-pel rate distortion costs. Finally, one of the reference video frames is selected, based on the minimum of the sub-pel rate distortion costs.

Figure 1:
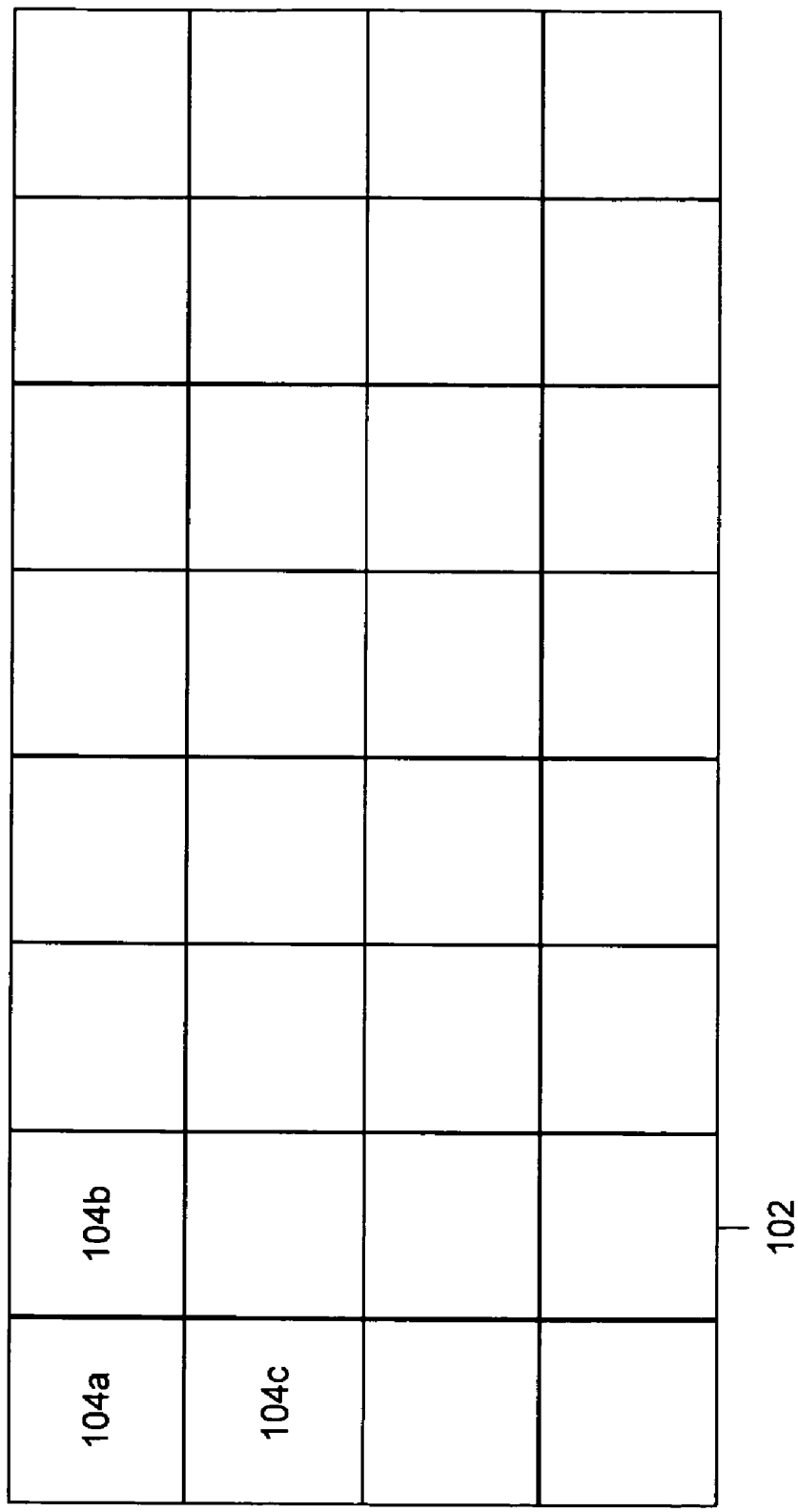
FIG. 1 depicts an exemplary video frame of a video sequence, in accordance with an embodiment of the invention.

FIG. 1 depicts an exemplary video frame 102 of a video sequence, in accordance with an embodiment of the invention. Video frame 102 is divided into a plurality of macroblocks, such as macroblocks 104, including for example, a macroblock 104a, a macroblock 104b, a macroblock 104c, and so forth. A macroblock is defined as a region of a video frame that is encoded as a unit, which usually includes 16×16 pixels. However, various macroblock sizes and shapes are possible under various video-encoding protocols. Each of macroblocks 104 includes a plurality of pixels.

Figure 2:
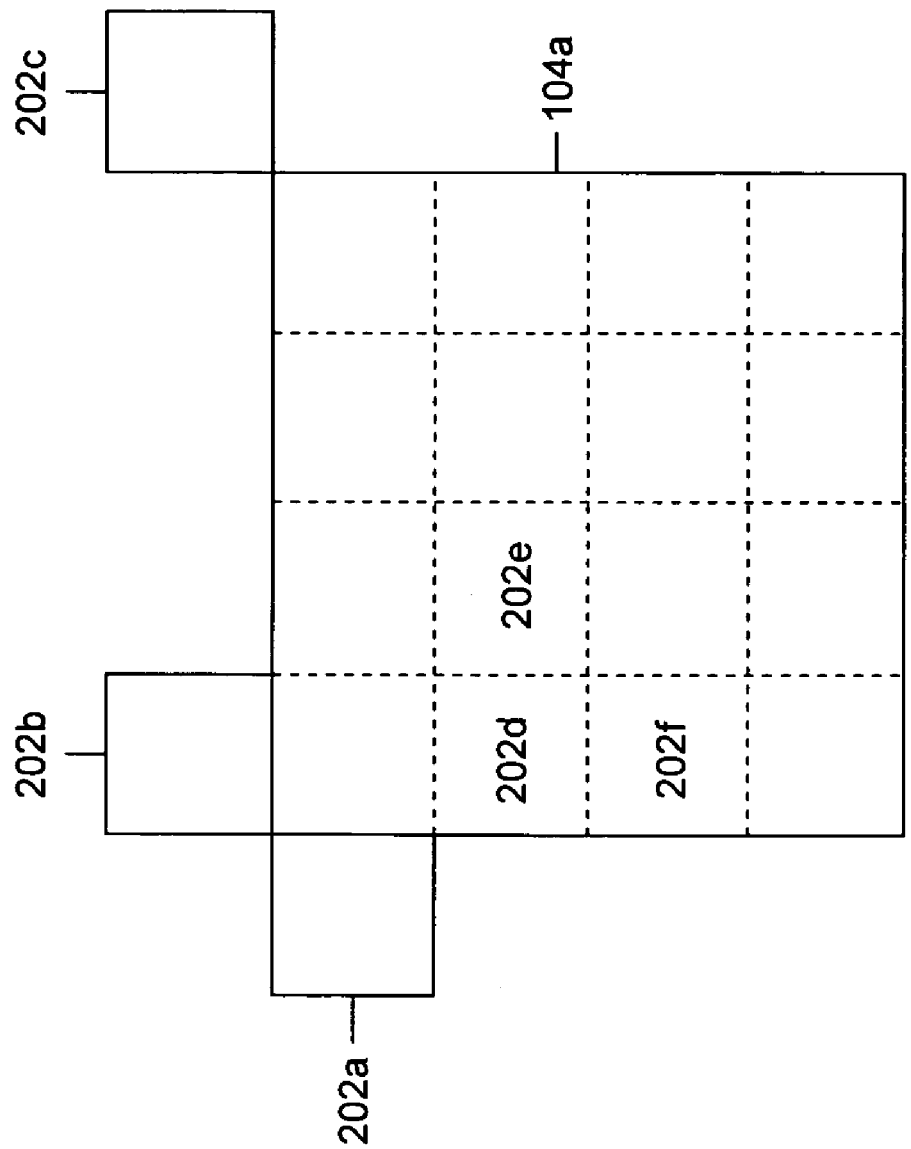
FIG. 2 depicts a macroblock of the video frame, in accordance with an embodiment of the invention.

FIG. 2 depicts a macroblock, such as macroblock 104a of video frame 102, in accordance with an embodiment of the invention. FIG. 2 includes macroblock 104a and a plurality of neighboring blocks such as blocks 202a, 202b, 202c, and so forth. Macroblock 104a includes a plurality of blocks, such as blocks 202, including, for example, a block 202d, a block 202e and a block 202f. In an embodiment of the invention, each of macroblocks 104 includes 16×16 pixels, and each of blocks 202 includes 4×4 pixels.

Blocks 202 are utilized to calculate one or more search centers for macroblocks 104. The search area is a rectangular array of pixels around a search center. It will be evident to a person skilled in the art that the search area can be of different sizes and shapes. The calculation of the one or more search centers is based on a criterion, which is the position of blocks 202 in a reference video frame. In an embodiment of the present invention, the search center is calculated by using the following equation:

$$\vec{sc} = \text{median}(\vec{mva}, \vec{mvb}, \vec{mvc}) \quad (1)$$

where $\vec{mva}$, $\vec{mvb}$ and $\vec{mvc}$ are motion vectors of the neighboring blocks of the macroblock, such as macroblock 104a, of the current video frame, with respect to the reference video frame.

In an embodiment of the invention, the reference video frame is a previously encoded video frame and may appear before or after a current video frame in the display order. Similarly, in an embodiment of the invention, the current video frame is a video frame that is being processed, such as video frame 102.

In an embodiment of the invention, the calculation of the search center of one of macroblocks 104 of the current video frame is based on the motion vectors of neighboring blocks 202 of macroblock 104a, with respect to the reference video frame. For example, the search center for macroblock 104a of the current video frame is calculated by utilizing the motion vectors of a left block 202a, an upper block 202b, and an upper-right block 202c of macroblock 104a, with respect to the reference video frame.

Figure 3:
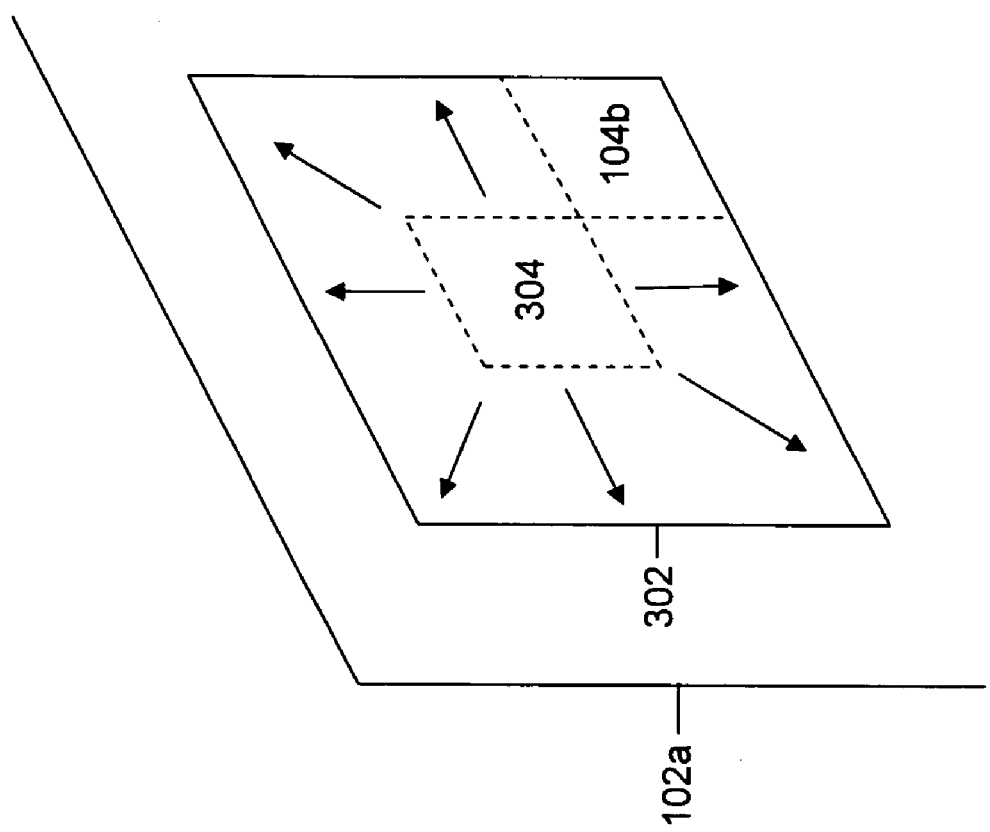
FIG. 3 depicts a reference video frame, in accordance with an embodiment of the invention.

FIG. 3 depicts a reference video frame, such as a reference video frame 102a, in accordance with an embodiment of the invention. Reference video frame 102a includes a search area 302 and a search center 304. Search area 302 includes a plurality of macroblocks 104, including, for example, a macroblock 104b. In an embodiment of the invention, a search area is a rectangular array of pixels around the search center. Search area 302 is therefore centered on search center 304. It will be apparent to a person skilled in the art that search area 302 may be in different sizes and shapes.

Figure 4:
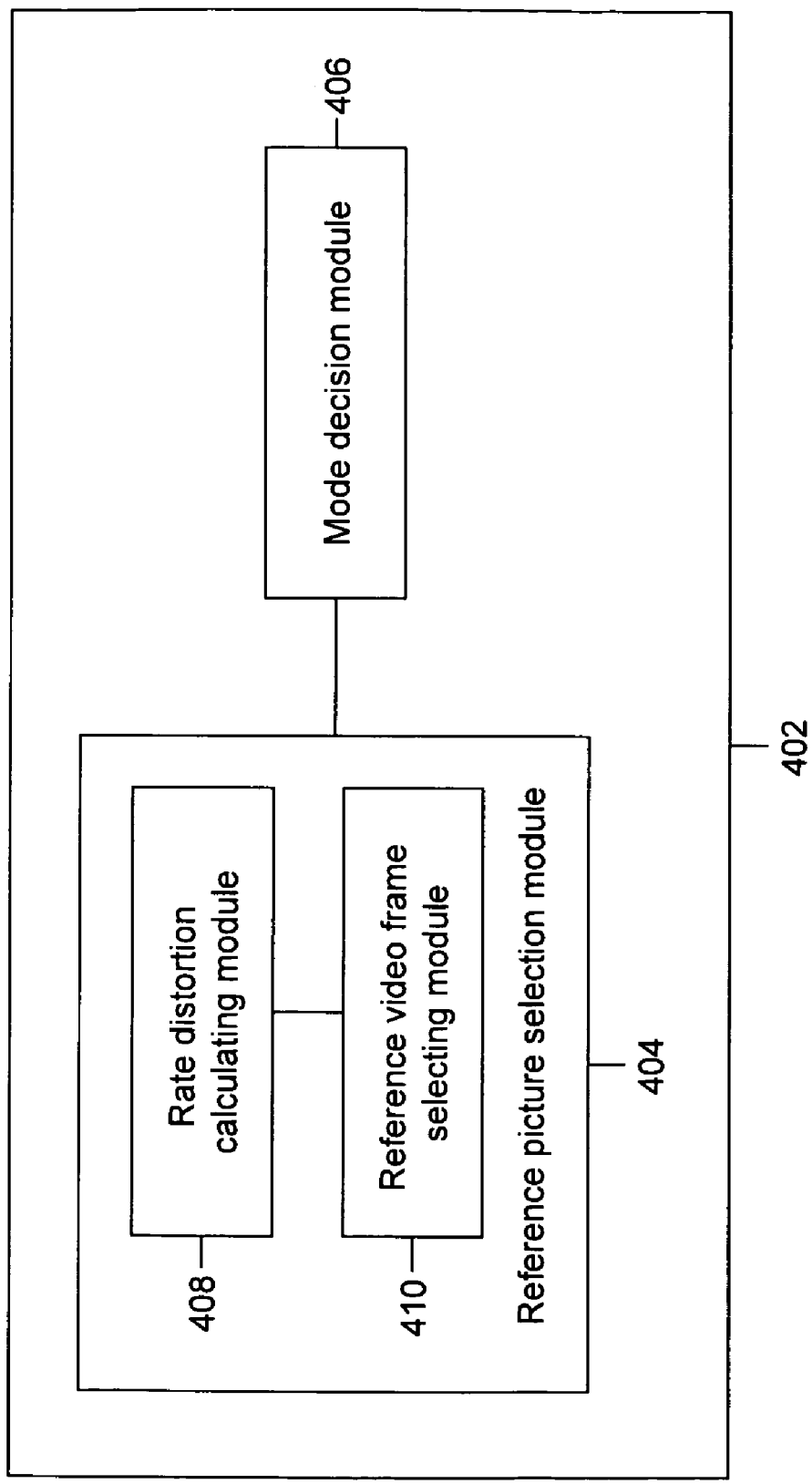
FIG. 4 depicts a block diagram illustrating a system for the selection of reference picture and mode decision, in accordance with an embodiment of the invention.

FIG. 4 depicts a block diagram illustrating a system 402 for the selection of reference picture and mode decision, in accordance with an embodiment of the invention. System 402 includes a reference picture selection module 404 and a mode decision module 406. Reference picture selection module 404 includes a rate distortion calculating module 408 and a reference video frame selecting module 410.

Reference picture selection module 404 selects the best reference picture from the frame buffer. Thereafter, mode decision module 406 selects a mode from the one or more modes, based on the reference video frame selected by reference picture selection module 404. Reference picture selection module 404 employs rate distortion calculating module 408 and reference video frame selecting module 410 to select the reference video frame.

Rate distortion calculating module 408 calculates the one or more full-pel rate distortion costs for each of the reference video frames. In an embodiment of the present invention, rate distortion costs are calculated for each of the reference video frames by using the following equation:

$$J_{MOTION}=SAD(c,r(RefPic,\vec{mv}))+\lambda_{MOTION}R(RefPic,\vec{mv}) \quad (2)$$

where SAD represents sum of absolute differences, $\lambda_{MOTION}$ is a Lagrange multiplier and is equal to $0.85 \times 2^{QP/3}$, QP is a quantization parameter, $\vec{mv}$ is a motion vector, RefPic is a reference picture number, and $R(RefPic,\vec{mv})$ represents bits used to code motion vectors and reference picture numbers. In an embodiment of the present invention, the sum of the absolute differences is defined by the following equation:

$$SAD(c,r) = \sum_{m=0}^{BW-1} \sum_{n=0}^{BH-1} |c(m,n) - r(m-mvx, n-mvy)| \quad (3)$$

where motion vector $\vec{mv}=(mvx,mvy)$, BW is the block width, BH is the block height, c is the current block, and r is the reference block.

An example of how rate of distortion is computed is now described. In this example, assume mode=0, and lambda_motion=4 and predicted_motion_vector=(1,1). The source data used for this example is shown in Table 1 below.

TABLE 1

211 215 208 191 179 166 150 128 94 73 139 211 201 162 123 86
114 151 158 159 180 205 206 213 224 217 207 214 202 184 167 146
165 148 140 134 130 118 102 76 51 37 51 143 186 173 160 134
122 148 169 173 175 183 184 177 173 152 140 188 209 186 150 118
87 104 130 157 166 163 169 171 159 131 102 133 171 180 194 200
183 182 176 170 166 162 150 132 101 71 49 104 195 201 170 137
167 204 204 195 161 153 158 191 206 190 166 158 175 190 192 191
147 143 143 150 153 151 140 134 123 96 66 78 145 179 172 180
186 201 195 195 176 164 138 151 178 155 126 123 166 202 208 210
98 144 161 171 170 160 156 166 193 196 164 142 152 182 189 196
64 86 87 104 116 107 85 111 174 186 181 179 187 192 167 148
91 194 201 201 190 167 155 145 168 190 167 146 149 185 203 205
32 30 25 29 43 31 17 29 69 91 106 109 99 96 79 51
58 131 145 142 144 140 130 116 140 180 174 152 152 176 191 188
50 52 54 54 58 55 50 48 39 27 24 29 22 23 29 31
43 42 45 51 56 72 64 43 58 111 139 139 138 141 131 116

The prediction data for mv=(0,0) is shown in Table 2 below.

TABLE 2

184 190 194 190 193 189 184 182 180 182 178 175 165 164 165 164
100 116 108 103 109 111 110 116 109 95 100 96 97 99 106 111
214 227 223 213 218 223 214 209 213 220 216 210 204 201 201 193
125 127 122 130 137 136 130 130 124 115 122 118 115 116 123 122
180 208 203 188 197 212 207 207 224 234 228 217 211 199 191 180
166 167 175 175 173 170 170 173 166 163 162 157 153 151 153 153
116 159 169 166 180 205 213 210 220 225 205 202 208 201 188 162
205 215 218 210 210 212 208 203 202 209 208 202 194 193 190 187
124 152 167 168 169 178 182 177 174 170 139 139 195 205 173 135

TABLE 2-continued 192 215 216 200 203 216 212 205 219 234 231 217 211 207 199 186
168 164 165 166 165 173 168 152 138 106 72 58 128 195 187 163
140 173 176 169 180 205 210 210 220 231 215 199 206 205 192 177
148 150 155 157 160 159 151 136 130 128 109 83 111 169 181 177
117 150 167 169 174 188 191 187 194 197 175 147 177 205 188 154
76 123 169 170 177 167 161 161 170 192 180 147 130 150 182 196
155 156 161 162 163 168 173 167 158 145 109 74 102 178 195 175

SAD(c,r) is calculated using equation 3:

$$SAD(c,r)=ABS(211-184)+ABS(215-190)+ \ldots +ABS(116-175)=15002$$

Rate distortion is calculated using equation 2:

$$mvdx=ABS(mvx-pmvx)=1$$

$$mvdy=ABS(mvy-pmvy)=1$$

$$J_{Motion}=SAD(c,r)+\text{lambda\_motion}(mvdx+mvdy)= 15002+4*2=15010$$

Subsequently, mode decision module 406 selects one of the modes, based on the full-pel rate distortion costs. In an embodiment of the present invention, mode decision module 406 selects the mode with the minimum rate distortion costs among the one or more full-pel rate distortion costs.

Further, rate distortion calculating module 408 calculates one or more sub-pel rate distortion costs for each of the reference video frames. Thereafter, reference video frame selecting module 410 selects one of the reference video frames based on the one or more sub-pel rate distortion costs. In an embodiment of the present invention, reference video frame selecting module 410 selects one of the reference video frames with the minimum rate distortion cost among the one or more sub-pel rate distortion costs.

In an embodiment of the present invention, the reference video frames are a part of one or two reference lists. For example, two reference video frames may be arranged in two different reference lists such as reference list 0 and reference list 1 which include a plurality of video frames. It will be apparent to a person skilled in the art that different arrangements of the reference video frames in the one or two reference lists are possible. Therefore, reference picture selection module 404 selects one of the reference video frames from the one or two reference lists.

In H.264, there are two reference lists, so-called list 0 and list 1. Normally, list 0 saves the forward reference frames and list 1 saves the backward reference frames. All the reference frames (either for list 0 or list 1) are stored in the reference frame buffer.

Figure 5:
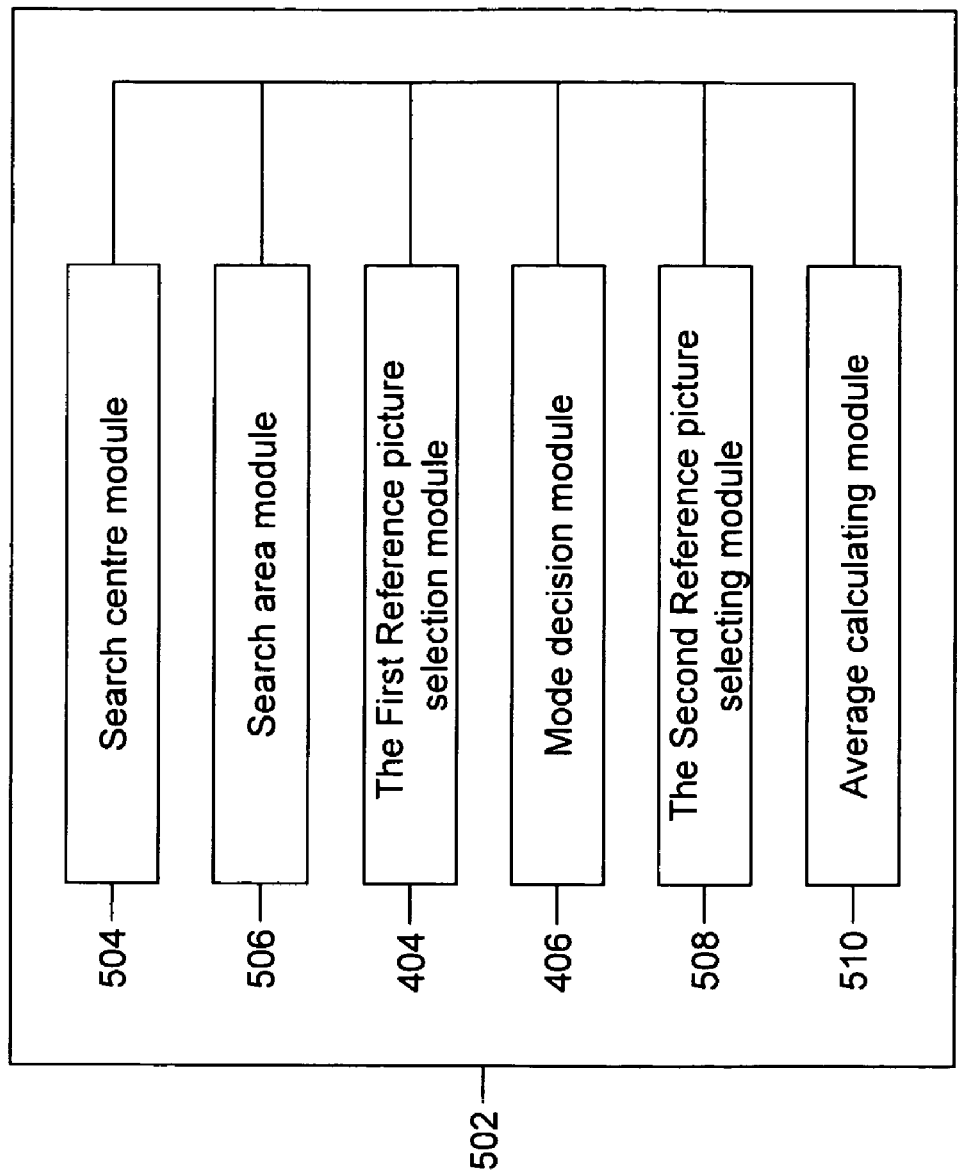
FIG. 5 depicts a block diagram illustrating a system for the selection of reference picture and mode decision, in accordance with another embodiment of the invention.

FIG. 5 depicts a block diagram illustrating a system 502 for reference picture selection and mode decision, in accordance with an embodiment of the invention. System 502 includes a reference picture selection module 404 based on full-pel rate distortion costs, a mode decision module 406, a search center module 504, a search area module 506, a reference picture selection module 508 based on sub-pel rate distortion costs, and an average calculating module 510.

In an embodiment of the present invention, system 502 performs reference picture selection and mode decision for P-picture encoding. Search center module 504 calculates search center 304 in reference video frame 102a. In an embodiment of the present invention, search center module 504 calculates respective search center 304 in each of the reference video frames for each of macroblocks 104 in the current video frame.

Based on search center 304, search area module 506 selects search area 302 in reference video frame 102a. In an embodiment of the present invention, search area module 506 selects search area 302 in each of the reference video frames. In another embodiment of the present invention, search area module 506 selects search area 302 for the current video frame. Search area 302 is centered on search center 304. In an embodiment of the present invention, search area 302 in each of the reference video frames is centered on the respective search center 304 in the respective reference video frames.

Thereafter, mode decision module 406 selects a mode from one or more modes. Subsequently, reference picture selection module 404 selects one of the reference video frames. The selection of the mode and the selection of the reference video frames are explained in conjunction with FIG. 4.

In another embodiment of the present invention, system 502 performs selection of reference picture and mode decision for B-picture encoding. The functionality of search center module 504, search area module 506, mode decision module 406 and reference picture selection module 404 is explained in the embodiment mentioned above. However, B-picture encoding requires two reference video frames for encoding. Therefore, the reference video frames are arranged in the one or two reference lists as reference list 0 or reference list 1.

For B-picture encoding, average calculating module 510 calculates an average of the predictive blocks in the two reference lists, based on the arrangement of the reference video frames in the two reference lists. Thereafter, the second reference picture selecting module 508 selects the reference picture in two reference lists by using the sub-pel rate distortion costs. The best reference picture can be in the two reference lists or be the result of the average calculating module 510. In an embodiment of the present invention, the second reference picture selecting module 508 selects the reference picture in two reference lists with the minimum cost among the sub-pel rate distortion costs. Further, reference picture selection module 404 selects one of the reference video frames, as explained in conjunction with FIG. 4. In an embodiment of the present invention, reference picture selection module 404 selects one of the reference video frames from the selected reference list.

Figure 6:
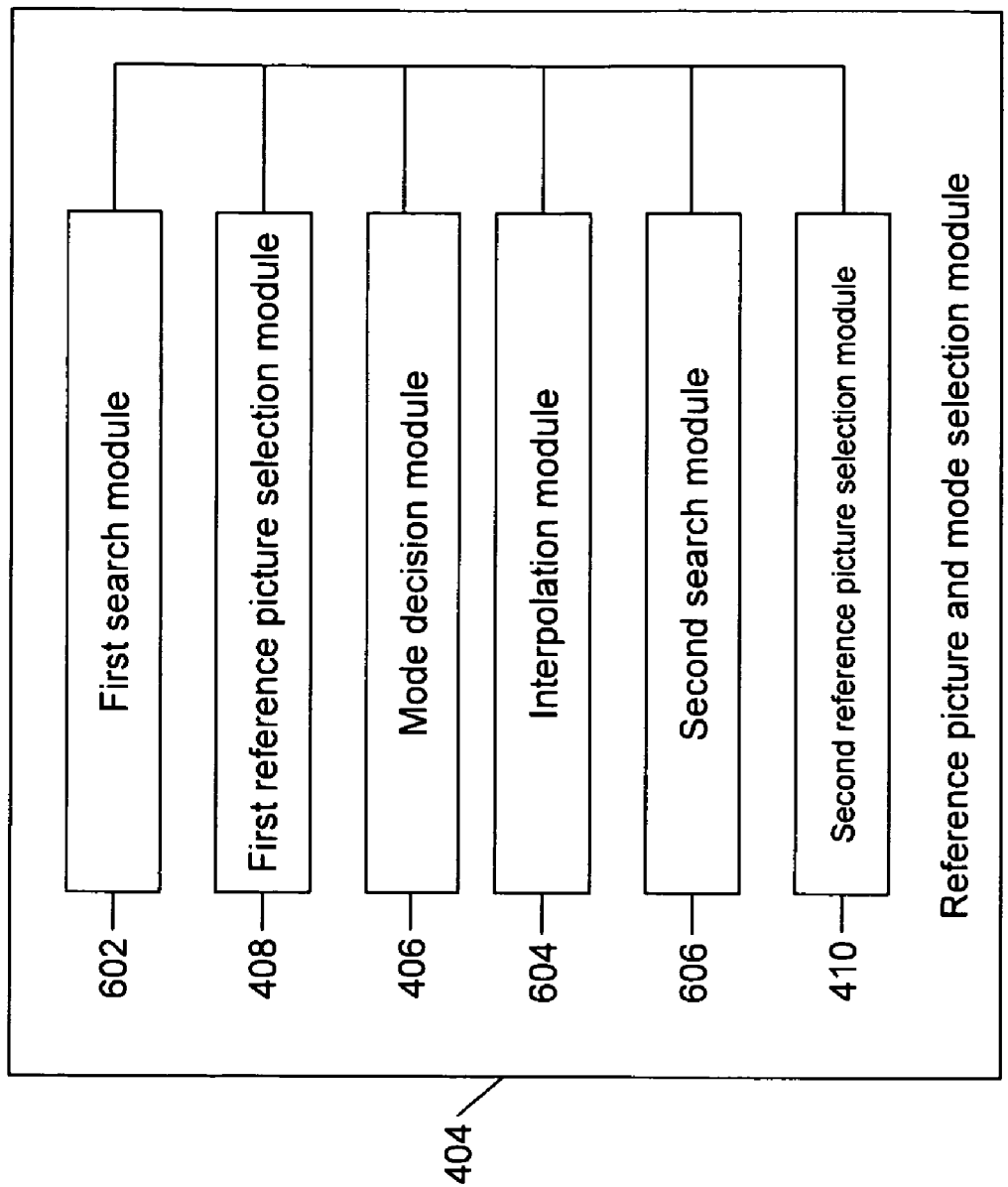
FIG. 6 depicts a block diagram illustrating a reference picture-selection module, in accordance with an embodiment of the invention.

FIG. 6 depicts a block diagram illustrating reference picture selection module 404 in accordance with an embodiment of the invention. Reference picture selection module 404 includes a first search module 602, rate distortion calculating module 408, an interpolation module 604, a second search module 606 and reference video frame selecting module 410.

First search module 602 performs a full-pixel search for each of the reference video frames, to calculate the one or more full-pel rate distortion costs, i.e. a full-pel rate distortion cost associated with each reference frame. In an embodiment of the present invention, first search module 602 performs a full-pixel search for all possible partitions of the reference frame. The one or more full-pel rate distortion costs are utilized to select one of the one or more modes with the mode decision module 406, as explained in conjunction with FIG. 4.

Thereafter, interpolation module 604 performs an interpolation for the reference video frames. In an embodiment of the present invention, interpolation module 604 performs an interpolation for each of the reference video frames implementing the selected mode. Further, second search module 606 performs a sub-pixel search for each of the reference video frames, to calculate the one or more sub-pel rate distortion costs. Subsequently, rate distortion calculating module 408 also calculates the one or more sub-pel rate distortion costs, based on the sub-pixel search. Thereafter, reference video frame selecting module 410 selects one of the reference video frames, based on the one or more sub-pel rate distortion costs. In an embodiment of the present invention, reference video frame selecting module 410 selects one of the reference video frames with the minimum cost among the one or more sub-pel rate distortion costs.

An example of how interpolation is performed based on the mode decision results after the full-pel search is described here. The data shown in Tables 3 and 4 below are results obtained after a full-pel motion search.

TABLE 3

| | Partition 0 rate distortion | | Partition 1 rate distortion | | Partition 2 rate distortion | | Partition 3 rate distortion | |
|---|---|---|---|---|---|---|---|---|
| Mode | Reference Frame 0 | Reference Frame 1 | Reference Frame 0 | Reference Frame 1 | Reference Frame 0 | Reference Frame 1 | Reference Frame 0 | Reference Frame 1 |
| 0 | 1328 | 1411 | NA | NA | NA | NA | NA | NA |
| 1 | 522 | 613 | 390 | 289 | NA | NA | NA | NA |
| 2 | 786 | 681 | 450 | 614 | NA | NA | NA | NA |
| 3 | 432 | 531 | 357 | 419 | 388 | 264 | 305 | 421 |

TABLE 4

| | Partition 0 | | Partition 1 | | Partition 2 | | Partition 3 | | Macroblock |
|---|---|---|---|---|---|---|---|---|---|
| Mode | Reference Selection | Rate distortion | Reference Selection | Rate distortion | Reference Selection | Rate distortion | Reference Selection | Rate distortion | Rate distortion |
| 0 | 0 | 1328 | NA | NA | NA | NA | NA | NA | 1328 |
| 1 | 0 | 522 | 1 | 289 | NA | NA | NA | NA | 811 |
| 2 | 1 | 681 | 0 | 450 | NA | NA | NA | NA | 1131 |
| 3 | 0 | 432 | 0 | 357 | 1 | 264 | 0 | 305 | 1358 |

From the above two tables, we find the best mode is mode 1. For the two partitions of mode 1, the best reference selections are 0 and 1, respectively. Once we have this result, we will continue with the interpolation procedure. The interpolation will be done using mode 1 with the best full-pel motion vectors from reference selection 0 and 1.

For example, in this case, the best mode is 1. Assume we have the following results for mode 1:

| For Partition 0: | |
|---|---|
| Reference selection 0: | best_full_pel_mv = (1, 2) |
| Reference selection 1: | best_full_pel_mv = (2, 4) |
| For Partition 1: | |
| Reference selection 0: | best_full_pel_mv = (−2, 5) |
| Reference selection 1: | best_full_pel_mv = (−3, 7) |

In this example, the interpolation will be done as following way:

| For reference selection 0 picture: | |
|---|---|
| Partition 0 (top 16 × 8): | centered around full-pel mv (1, 2) |
| Partition 1 (bot 16 × 8): | centered around full-pel mv (−2, 5) |
| For reference selection 1 picture: | |
| Partition 0 (top 16 × 8): | centered around full-pel mv (2, 4) |
| Partition 1 (bot 16 × 8): | centered around full-pel mv (−3, 7) |

Figure 7:
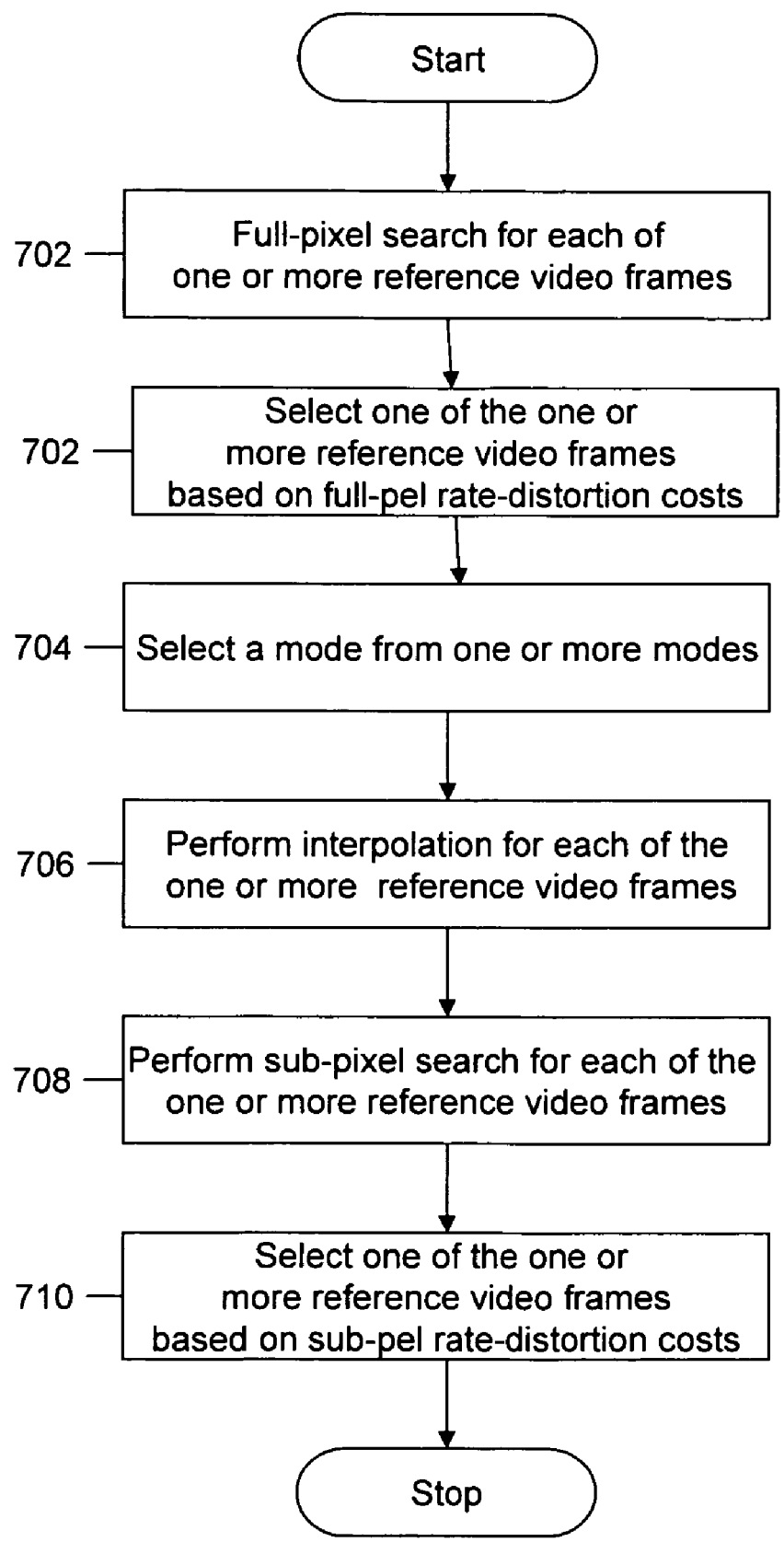
FIG. 7 depicts a flowchart illustrating a method for the selection of reference picture and mode decision, in accordance with an embodiment of the invention.

FIG. 7 depicts a flowchart illustrating a method for the selection of reference picture and mode decision, in accordance with an embodiment of the invention. A video frame such as video frame 102 includes a plurality of macroblocks such as macroblocks 104. At step 702, a full-pixel search is performed for each of the one or more reference video frames such as reference video frame 102a. In an embodiment of the present invention, the full-pixel search is performed for each of the reference video frames of one or two reference lists to calculate one or more full-pel rate distortion costs. The reference video frames are arranged in the one or two reference lists.

Further, at step 704, a mode from one or more modes is selected, based on the one or more full-pel rate distortion costs. The one or more modes are utilized to partition the reference video frames. In an embodiment of the present invention, this mode selection is performed, based on the reference video frames with the minimum full-pel rate distortion cost among the one or more full-pel rate distortion costs.

Thereafter, at step 706, an interpolation is performed for each of the reference video frames. In an embodiment of the present invention, the interpolation of the reference video frames divides pixels into fractions. For example, the interpolation may produce a half pixel (½ pixel), a quarter pixel (¼ pixel), and so forth. In an embodiment of the present invention, the interpolation is performed for each of the reference video frames of the one or two reference lists. In another embodiment of the present invention, the interpolation is performed for each of the reference video frames implementing the selected mode.

Subsequently, at step 708, a sub-pixel search is performed for each of the reference video frames. In an embodiment of the present invention, the sub-pixel search is performed for each of the reference video frames of the one or two reference lists. The reference video frames are arranged in the one or two reference lists. The sub-pixel search is performed to calculate the one or more sub-pel rate distortion costs. In an embodiment of the present invention, the one or more sub-pel rate distortion costs are calculated for each of the reference video frames by using equation (2) illustrated in FIG. 4.

At step 710, one of the reference video frames is selected, based on the one or more sub-pel rate distortion costs. In an embodiment of the present invention, one of the reference video frames with the minimum rate distortion cost among the one or more second-rate distortion costs is selected.

Figure 8A:
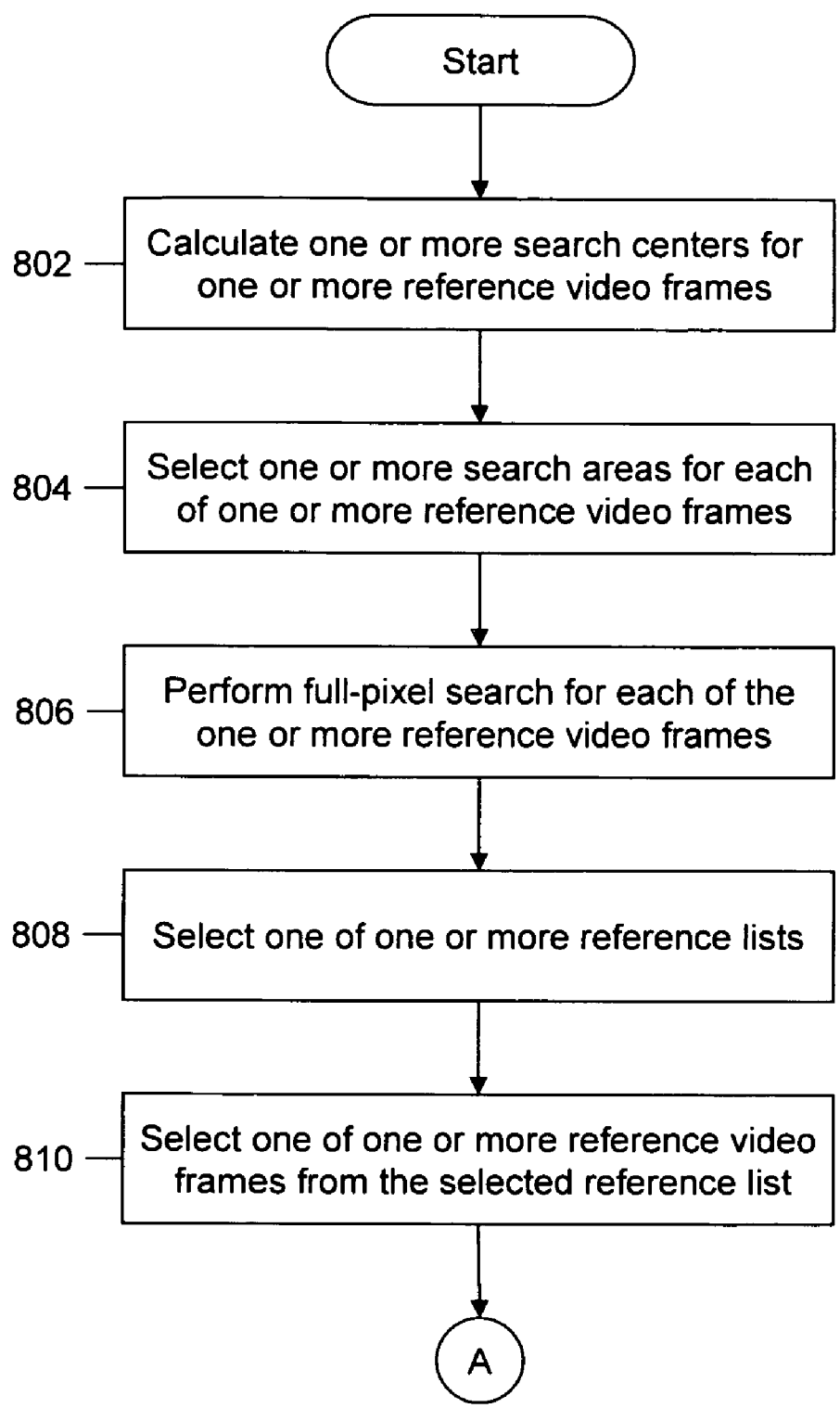
FIGS. 8(a) and 8(b) depict a flowchart illustrating a method for the selection of reference picture and mode decision, in accordance with another embodiment of the invention.
Figure 8B:
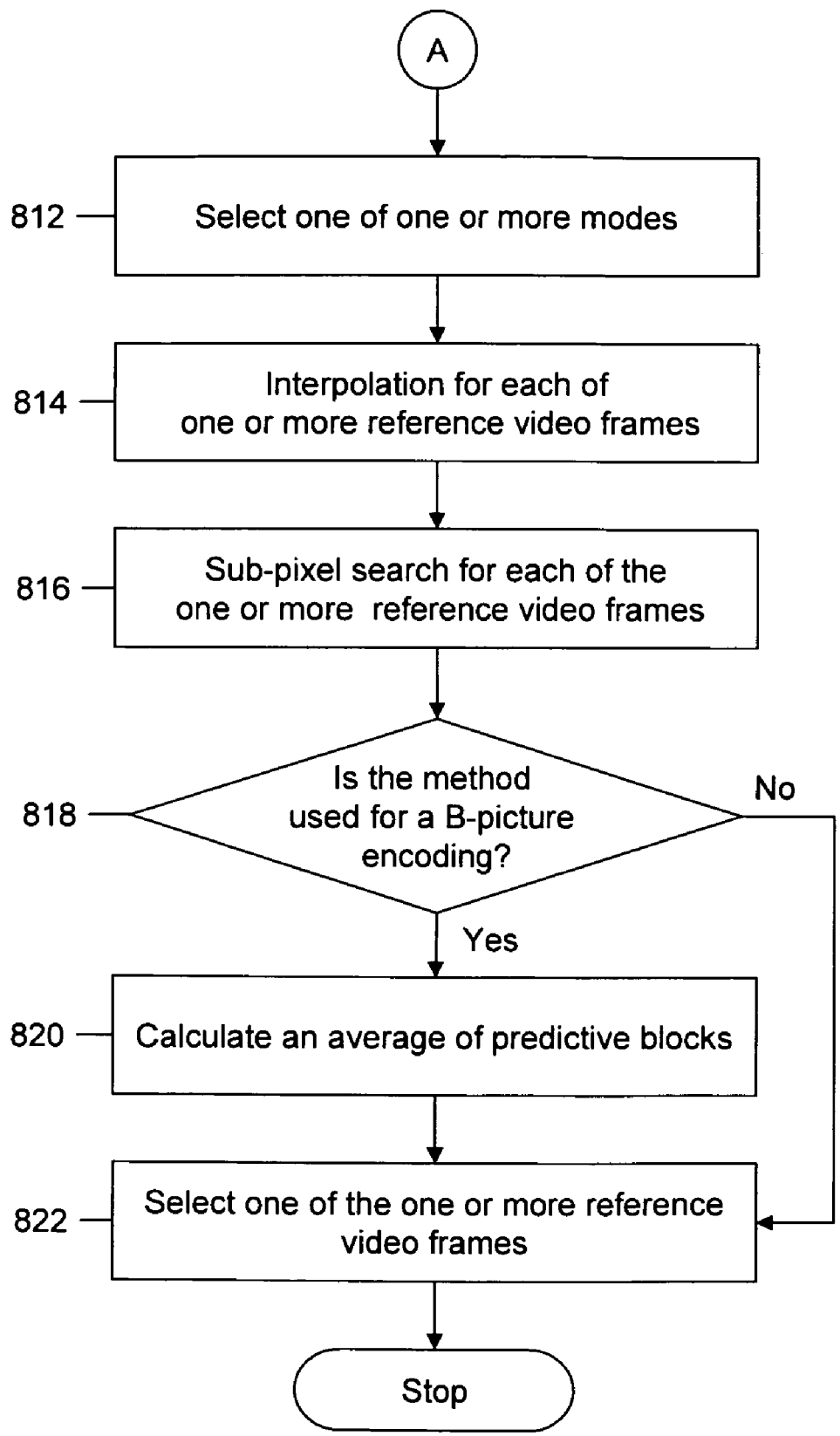

FIGS. 8(a) and 8(b) depict a flowchart illustrating a method for the selection of reference picture and mode decision, in accordance with another embodiment of the invention. A video sequence includes a plurality of video frames, such as video frame 102. The video frame includes a plurality of macroblocks such as macroblocks 104. A macroblock of a current video frame is loaded from a video frame buffer. The video frame buffer stores the current video frame of the video sequence. At step 802, one or more search centers such as search center 304 are calculated in reference video frames, such as reference video frame 102a, for each of the macroblocks in the current video frame. In an embodiment of the present invention, the respective search centers are determined for each of the reference video frames. The determination of the search centers is based on a criterion, e.g., the position of blocks, such as blocks 202, in the reference video frames that provides the best area to locate a reference block.

Based on the calculated search centers, search areas such as search area 302 in the reference video frames are selected at step 804. In an embodiment of the present invention, the respective search areas in each of the reference video frames are selected. The search areas in the reference video frames are centered on the search center.

Thereafter, the full-pixel search is performed for each of the reference video frames at step 806. In an embodiment of the present invention, the full-pixel search is performed for each of the search areas of the reference video frames, to calculate the one or more full-pel rate distortion costs. The calculation of the one or more full-pel rate distortion costs for each of the reference video frames is explained in conjunction with FIG. 7.

Further, one of the one or two reference lists is selected, based on the one or more full-pel rate distortion costs, at step 808. In an embodiment of the present invention, the selection is performed, based on the minimum cost among the one or more full-pel rate distortion costs. In an embodiment of the present invention, the selection is performed by using one of the reference lists with the minimum cost among the one or more full-pel rate distortion costs, as explained in conjunction with equation (2).

Thereafter, one of the one or more reference video frames is selected at step 810. In an embodiment of the present invention, one of the reference video frames is selected from the selected reference list, based on the one or more full-pel rate distortion costs. In an embodiment of the present invention, one of the reference video frames with the minimum cost among the one or more full-pel rate distortion costs, as explained in conjunction with equation (2), is selected.

In another embodiment of the present invention, for a single reference video frame, step 806 is followed by step 810.

In yet another embodiment of the present invention, step 806 is followed by step 810 for each of the one or two reference lists including a plurality of reference video frames. For each of the reference lists, one of the reference video frames is selected, based on the full-pel rate distortion costs. Further, step 808 is performed after step 810. One of the reference lists is then selected, based on the full-pel rate distortion costs as, explained in conjunction with equation (2).

Thereafter, one of the one or more modes is selected at step 812. The one or more modes are utilized to partition the reference video frames. The selection at step 812 is performed by utilizing the partitioning mode of the selected reference video frames. In an embodiment of the present invention, the selection at step 812 is performed by using the reference video frame selected at step 810.

Subsequently, the interpolation for each of the reference video frames is performed at step 814. In an embodiment of the present invention, this interpolation is performed for each of the reference video frames of the one or two reference lists. In another embodiment of the present invention, the interpolation is performed for each of the reference video frames implementing the selected mode.

At step 816, a sub-pixel search is performed for each of the reference video frames. In an embodiment of the present invention, the sub-pixel search is performed for each of the search areas of the reference video frames. Further, the sub-pixel search is performed to calculate the one or more sub-pel rate distortion costs. In an embodiment of the present invention, the one or more sub-pel rate distortion costs are calculated for each of the reference video frames by using equation (2).

At step 818, it is determined if the method is used for B-picture encoding. If the method is used for B-picture encoding, an average of the predictive blocks is calculated at step 820. Thereafter, one of the reference video frames is selected at step 822.

For B frame coding, it will be enabled if the coding parameter "numBframes" is set to a non-zero number.

In an embodiment of the present invention, step 818 is followed by step 822 when the method is used for P-picture encoding. At step 822, one of the reference video frames is selected. In an embodiment of the present invention, one of the one or two reference lists is selected prior to step 822. The selection of the one or two reference lists is based on the one or more sub-pel rate distortion costs. Thereafter, one of the reference video frames is selected from the selected reference list at step 822.

The invention provides a method, system and computer program product for the selection of reference picture and mode decision during the motion estimation of a video sequence. The video sequence includes a plurality of video frames, and each of the plurality of video frames includes a plurality of macroblocks. For each of the reference video frames, a full-pixel search is performed to calculate one or more full-pel rate distortion costs. One of the modes is selected, based on the full-pel rate distortion costs. Thereafter, an interpolation is performed for each of the reference video frames implementing the selected mode. Further, a sub-pixel search is performed for each of the reference video frames, to calculate the one or more sub-pel rate distortion costs. Finally, a reference video frame is selected, based on the one or more sub-pel rate distortion costs. Therefore, the method and system provide an efficient and accurate selection of reference picture and mode decision. Further, the amount of computational power and computational time required is reduced.

The computer program product of the invention is executable on a computer system, to enable the computer system to perform a method of video encoding that includes a motion estimation method of the present invention. The computer system includes a microprocessor, an input device, a display unit, and an interface to the Internet. The microprocessor is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. Further, the computer system includes a communication unit, which enables the computer to connect to other databases and the Internet through an I/O interface. The communication unit enables the transfer and reception of data from other databases and may include a modem, an Ethernet card or any similar device, which enables the computer system to connect to databases and networks such as LAN, MAN, WAN, and the Internet. The computer system enables inputs from a user through an input device that is accessible to the system through an I/O interface.

The computer system executes a set of instructions that are stored in one or more storage elements, to process input data. The set of instructions may be a program instruction means. The storage elements may also hold data or other information, as required, or may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. Processing of input data by the processing machine may be in response to a user's commands, the result of previous processing, or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

Furthermore, throughout this specification (including the claims if present), unless the context requires otherwise, the word "comprise" or variations such as "comprises" or "comprising" are understood to imply the inclusion of a stated element or group of elements, but not the exclusion of any other element or group of elements. The word "include," or variations such as "includes" or "including," are understood to imply the inclusion of a stated element or group of elements, but not the exclusion of any other element or group of elements. Claims that do not contain the terms "means for" and "step for" are not intended to be construed under 35 U.S.C. §112, paragraph 6.

What is claimed is:

1. A method for reference picture selection and mode decision during motion estimation of a video sequence, the video sequence comprising a plurality of video frames, each of the plurality of video frames comprising a plurality of macroblocks, wherein one of the plurality of macroblocks of a current video frame is loaded from a video frame buffer and is processed by a processing machine to perform specific tasks of the method, the method comprising:
   a. performing full-pixel search for each of one or more reference video frames, wherein the one or more reference video frames are a part of one or two reference lists, the full-pixel search being performed for calculating one or more full-pel rate distortion costs;

b. selecting one of the one or more reference video frames, the selection based on minimum of the one or more sub-pel rate distortion costs;

c. selecting a mode from one or more modes, wherein the one or more modes are used for partitioning a macroblock, the selection being performed using one of the one or more reference video frames, the one of the one or more reference video frames having minimum of the one or more full-pel rate distortion costs;

d. performing interpolation for each of the one or more reference video frames of the one or two reference lists, each of the one or more reference video frames implementing the selected mode;

e. performing sub-pixel search for each of the one or more reference video frames, the sub-pixel search being performed for calculating one or more sub-pel rate distortion costs; and f. selecting one of the one or more reference video frames, the selection based on minimum of the one or more sub-pel rate distortion costs.

2. The method according to claim 1 further comprising:
a. calculating one or more search centers in each of the one or more reference video frames; and
b. selecting one or more search areas in-each of the one or more reference video frames based on the one or more search centers, wherein the full-pixel search is performed for each of the one or more search areas.

3. The method according to claim 1 further comprising selecting one of the one or two reference lists, the selection being based on the one or more full-pel rate distortion costs.

4. The method according to claim 3 further comprising selecting one of the one or more reference video frames from the selected reference list.

5. The method according to claim 4 further comprising calculating an average of predictive blocks in the one or two reference lists, the calculation being performed in case of B-picture encoding.

6. A system for reference picture selection and mode decision during motion estimation of a video sequence, the video sequence comprising a plurality of video frames, each of the plurality of video frames comprising a plurality of macroblocks, the system comprising:
a. a reference picture selection module comprising:
  i. a rate distortion calculating module for calculating one or more full-pel rate distortion costs and one or more sub-pel rate distortion costs for each of one or more reference video frames, wherein the one or more reference video frames are a part of one or two reference lists;
  ii. a reference video frame selecting module for selecting one of the one or more reference video frames, wherein the reference video frame selecting module selects the reference video frame based on the one or more sub-pel rate distortion costs; and
b. a mode decision module for selecting a mode from one or more modes for partitioning a macroblock, the mode decision module selects the mode based on the one or more full-pel rate distortion costs.

7. The system according to claim 6 further comprising:
a. a search center module for calculating one or more search centers in each of the one or more reference video frames; and
b. a search area module for selecting one or more search areas in each of the one or more reference video frames, each of the one or more search areas being selected based on the one or more search centers.

8. The system according to claim 6, wherein the reference picture selection module further comprises a first search module, the first search module for performing full-pixel search for each of the one or more reference video frames, the full-pixel search being performed for calculating the one or more full-pel rate distortion costs.

9. The system according to claim 6, wherein the reference picture selection module further comprises an interpolation module, the interpolation module for performing interpolation of each of the one or more reference video frames, each of the one or more reference video frames implementing the selected mode.

10. The system according to claim 6, wherein the reference picture selection module further comprises a second search module for performing a sub-pixel search for each of the one or more reference video frames, the sub-pixel search being performed for calculating the one or more sub-pel rate distortion costs.

11. The system according to claim 6 further comprising a reference list selecting module for selecting one of the one or two reference lists based on the one or more sub-pel rate distortion costs.

12. The system according to claim 6 further comprising an average calculating module for calculating an average of predictive blocks in the one or two reference lists, the calculation being performed in case of B-picture encoding.

13. A non-transitory computer program product for use with a computer, the computer program product comprising a computer usable medium having a computer readable program code embodied therein for reference picture selection and mode decision during motion estimation of a video sequence, the video sequence comprising a plurality of video frames, each of the plurality of video frames comprising a plurality of macroblocks, wherein one of the plurality of macroblocks of a current video frame is loaded from a video frame buffer, the computer program code performing:
a. full-pixel search for each of one or more reference video frames, wherein the one or more reference video frames are a part of one or two reference lists, the full-pixel search being performed for calculating one or more full-pel rate distortion costs;
b. selecting a mode from one or more modes, wherein the one or more modes are used for partitioning a macroblock, the selection being performed using one of the one or more reference video frames, the one of the one or more reference video frames having minimum of the one or more full-pel rate distortion costs;
c. interpolation for each of the one or more reference video frames of the one or two reference lists, each of the one or more reference video frames implementing the selected mode;
d. sub-pixel search for each of the one or more reference video frames, the sub-pixel search being performed for calculating one or more sub-pel rate distortion costs; and
e. selecting one of the one or more reference video frames, the selection based on minimum of the one or more sub-pel rate distortion costs.

* * * * *